United States Patent
Lee et al.

(10) Patent No.: US 6,541,906 B2
(45) Date of Patent: Apr. 1, 2003

(54) FIELD EMISSION DISPLAY PANEL EQUIPPED WITH A DUAL-LAYER CATHODE AND AN ANODE ON THE SAME SUBSTRATE AND METHOD FOR FABRICATION

(75) Inventors: Cheng-Chung Lee, Chutung-Hsinchu (TW); Jane-Hway Liao, Chutung Hsinchu (TW); Hua-Chi Cheng, Chuonglin (TW); Wen-Chun Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 106 days.

(21) Appl. No.: 09/864,005

(22) Filed: May 23, 2001

(65) Prior Publication Data

US 2002/0175617 A1 Nov. 28, 2002

(51) Int. Cl.⁷ .............................. H01J 1/62; H01J 63/04
(52) U.S. Cl. ........................ 313/495; 313/309; 313/336; 313/351
(58) Field of Search ................................ 313/495, 496, 313/310, 309, 311, 346 R, 326, 308, 497; 445/50, 51

(56) References Cited

U.S. PATENT DOCUMENTS 6,023,126 A * 2/2000 Karpov ........................ 313/310
6,445,122 B1 * 9/2002 Chuang et al. ............. 313/495

* cited by examiner

Primary Examiner—Ashok Patel
Assistant Examiner—Jason Phinney
(74) Attorney, Agent, or Firm—Tung & Associates

(57) ABSTRACT

A field emission display panel of the diode structure that has a dual-layer cathode and an anode formed on a bottom glass panel and a method for such fabrication are described. In the FED panel, a plurality of emitter stacks is formed each having a layer of dielectric material, a first layer of a conductive paste coated with a layer of nanotube emitters on a peripheral, sidewall surface as a cathode, and a second layer of the conductive paste deposited on top of the nanotube emitter layer. The first layer and the second layer are formed in a column shape. The second conductive paste layer stops any nanotubes left on a top surface of the first conductive paste layer from emitting electrons in an upward direction and restricts all emitted electrons in a downward direction.

12 Claims, 2 Drawing Sheets

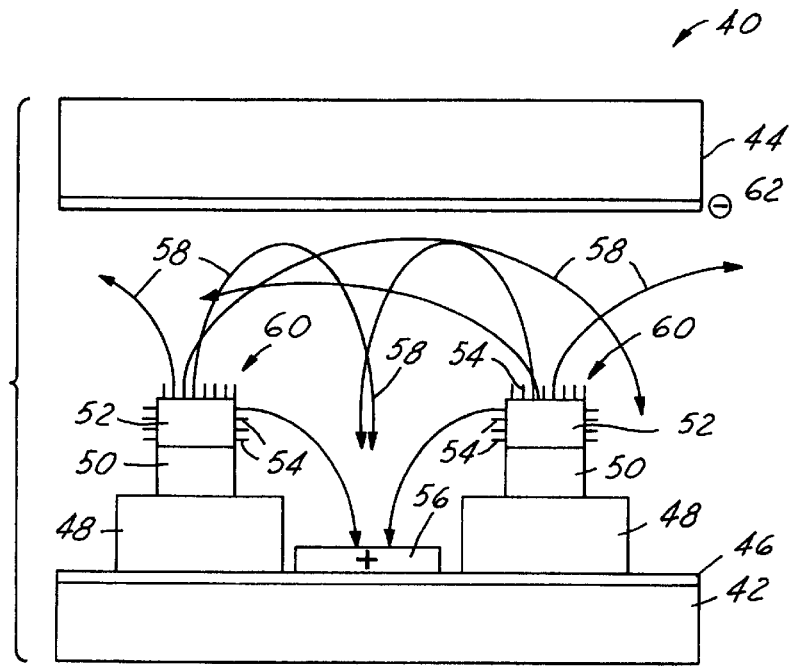
(PRIOR ART)
FIG. 2
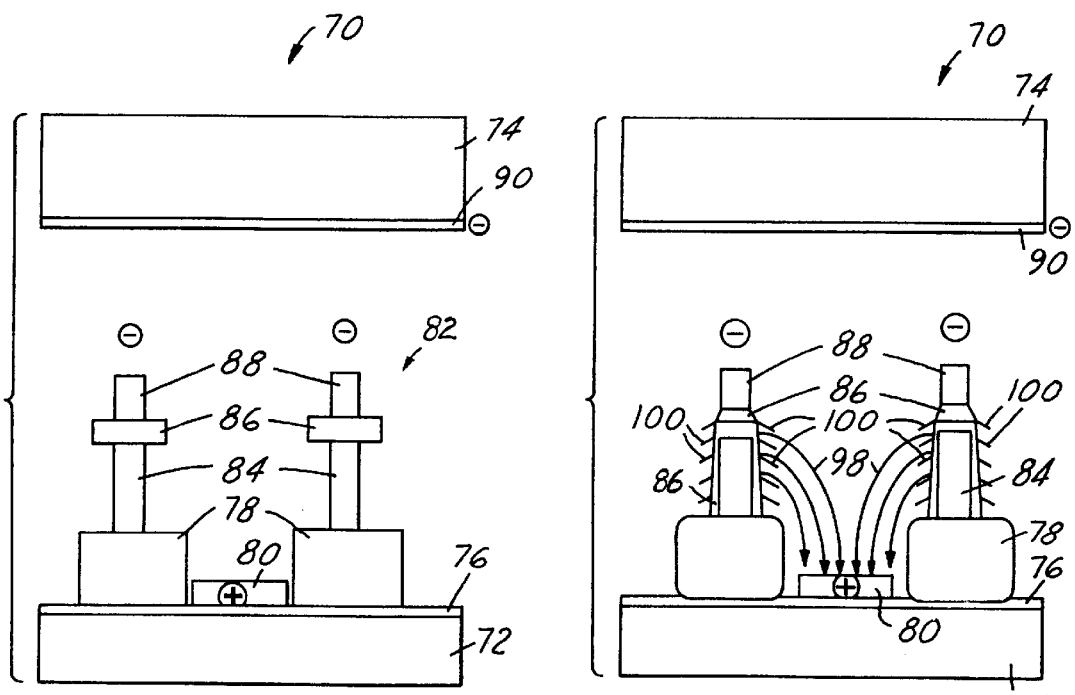
FIG. 3
FIG. 4

FIELD EMISSION DISPLAY PANEL EQUIPPED WITH A DUAL-LAYER CATHODE AND AN ANODE ON THE SAME SUBSTRATE AND METHOD FOR FABRICATION

FIELD OF THE INVENTION

The present invention generally relates to a field emission display (FED) panel and a method for fabricating the panel and more particularly, relates to a field emission display panel that is equipped with a dual-layer cathode and an anode formed on the same substrate, and a method for fabricating the panel.

BACKGROUND OF THE INVENTION

In recent years, flat panel display devices have been developed and used in electronic applications such as personal computers. One of the popularly used flat panel display device is an active matrix liquid crystal display which provides improved resolution. However, liquid crystal display device has many inherent limitations that render it unsuitable for a number of applications. For instance, liquid crystal displays have numerous fabrication limitations including a slow deposition process for coating a glass panel with amorphous silicon, high manufacturing complexity and low yield. Moreover, the liquid crystal display devices require a fluorescent back light which draws high power while most of the light generated is wasted. A liquid crystal display image may be difficult to see under bright light conditions or at wide viewing angles which further limit its use in many applications.

Other flat panel display devices have been developed in recent years to replace the liquid crystal display panels. One of such devices is a field emission display device that overcomes some of the limitations of LCD and provides significant advantages over the traditional LCD devices. For instance, the field emission display devices have higher contrast ratio, larger viewing angle, higher maximum brightness, lower power consumption and a wider operating temperature range when compared to a conventional thin film transistor (TFT) liquid crystal display panel.

A most drastic difference between a FED and a LCD is that, unlike the LCD, FED produces its own light source utilizing colored phosphors. The FEDs do not require complicated, power-consuming back lights and filters and as a result, almost all the light generated by a FED is visible to the user. Moreover, the FEDs do not require large arrays of thin film transistors, and thus, a major source of high cost and yield problems for active matrix LCDs is eliminated.

In a FED, electrons are emitted from a cathode and impinge on phosphors coated on the back of a transparent cover plate to produce an image. Such a cathodoluminescent process is known as one of the most efficient methods for generating light. Contrary to a conventional CRT device, each pixel or emission unit in a FED has its own electron source, i.e., typically an array of emitting microtips. A voltage difference existed between a cathode and a gate electrode which extracts electrons from the cathode and accelerates them toward the phosphor coating. The emission current, and thus the display brightness, is strongly dependent on the work function of the emitting material. To achieve the necessary efficiency of a FED, the cleanliness and uniformity of the emitter source material are very important.

In order for the electron to travel in a FED, most FEDs are evacuated to a low pressure such as $10^{-7}$ torr in order to provide a log mean free path for the emitted electrons and to prevent contamination and deterioration of the microtips. The resolution of the display can be improved by using a focus grid to collimate electrons drawn from the microtips.

In the early development for field emission cathodes, a metal microtip emitter of molybdenum was utilized. In such a device, a silicon wafer is first oxidized to produce a thick silicon oxide layer and then a metallic gate layer is deposited on top of the oxide. The metallic gate layer is then patterned to form gate openings, while subsequent etching of the silicon oxide underneath the openings undercuts the gate and creates a well. A sacrificial material layer such as nickel is deposited to prevent deposition of nickel into the emitter well. Molybdenum is then deposited at normal incidence such that a cone with a sharp point grows inside the cavity until the opening closes there above. An emitter cone is left when the sacrificial layer of nickel is removed.

In an alternate design, silicon microtip emitters are produced by first conducting a thermal oxidation on silicon and then followed by patterning the oxide and selectively etching to form silicon tips. Further oxidation or etching protects the silicon and sharpens the point to provide a sacrificial layer. In another alternate design, the microtips are built onto a substrate of a desirable material such as glass, as an ideal substrate for large area flat panel displays. The microtips can be formed of conducting materials such as metals or doped semi-conducting materials. In this alternate design for a FED device, an interlayer that has controlled conductivity deposited between the cathode and the microtips is highly desirable. A proper resistivity of the interlayer enables the device to operate in a stable condition. In fabricating such FED devices, it is therefore desirable to deposit an amorphous silicon film which has electrical conductivity in an intermediate range between that of intrinsic amorphous silicon and $n^+$ doped amorphous silicon. The conductivity of the $n^+$ doped amorphous silicon can be controlled by adjusting the amount of phosphorous atoms contained in the film.

Generally, in the fabrication of a FED device, the device is contained in a cavity of very low pressure such that the emission of electrons is not impeded. For instance, a low pressure of $10^{-7}$ torr is normally required. In order to prevent the collapse of two relatively large glass panels which form the FED device, spacers must be used to support and provide proper spacing between the two panels. For instance, in conventional FED devices, glass spheres or glass crosses have been used for maintaining such spacings in FED devices. Elongated spacers have also been used for such purpose.

Referring initially to FIG. 1A wherein an enlarged, cross-sectional view of a conventional field emission display device 10 is shown. The FED device 10 is formed by depositing a resistive layer 12 of typically an amorphous silicon base film on a glass substrate 14. An insulating layer 16 of a dielectric material and a metallic gate layer 18 are then deposited and formed together to provide metallic microtips 20 and a cathode structure 22 is covered by the resistive layer 12 and thus, a resistive but somewhat conductive amorphous silicon layer 12 underlies a highly insulating layer 16 which is formed of a dielectric material such as $SiO_2$. It is important to be able to control the resistivity of the amorphous silicon layer 12 such that it is not overly resistive but yet, it will act as a limiting resistor to prevent excessive current flow if one of the microtips 20 shorts to the metal layer 18.

A completed FED structure 30 including anode 28 mounted on top of the structure 30 is shown in FIG. 1B. It is to be noted, for simplicity reasons, the cathode layer 22 and the resistive layer 12 are shown as a single layer 22 for the cathode. The microtips 20 are formed to emit electrons 26 from the tips of the microtips 20. The gate electrodes 18 are provided with a positive charge, while the anode 28 is provided with a higher positive charge. The anode 28 is formed by a glass plate 36 which is coated with phosphorous particles 32. An intermittent conductive layer of indium-tin-oxide (ITO) layer 34 may also be utilized to further improve the brightness of the phosphorous layer when bombarded by electrons 26. This is shown in a partial, enlarged cross-sectional view of FIG. 1C. The total thickness of the FED device is only about 2 mm, with vacuum pulled in-between the lower glass plate 14 and the upper glass plate 36 sealed by sidewall panels 38 (shown in FIG. 1B).

The conventional FED devices formed by microtips shown in FIGS. 1A–1C produce a flat panel display device of improved quality when compared to liquid crystal display devices. However, a major disadvantage of the microtip FED device is the complicated processing steps that must be used to fabricate the device. For instance, the formation of the various layers in the device, and specifically, the formation of the microtips requires a thin film deposition technique utilizing a photolithographic method. As a result, numerous photomasking steps must be performed in order to define and fabricate the various structural features in the FED. The CVD deposition processes and the photolithographic processes involved greatly increase the manufacturing cost of a FED device.

In a U.S. patent application Ser. No. 09/377,315 filed Aug. 19, 1999, now U.S. Pat. No. 6,359,383 assigned to the common assignee of the present invention, a field emission display device and a method for fabricating such device of a triode structure using nanotube emitters as the electron emission sources were disclosed. In the triode structure FED device, the device is constructed by a first electrically insulating plate, a cathode formed on the first electrically insulating plate by a material that includes metal, a layer formed on the cathode of a high electrical resistivity material, a layer of nanotube emitters formed on the resistivity layer of a material of carbon, diamond or diamond-like carbon wherein the cathode, the resistivity layer and the nanotube emitter layer form an emitter stack insulated by an insulating rib section from adjacent emitter stacks, a dielectric material layer perpendicularly overlying a multiplicity of the emitter stacks, a gate electrode on top of the dielectric material layer, and an anode formed on a second electrically insulating plate overlying the gate electrode. The FED device proposed can be fabricated advantageously by a thick film printing technique at substantially lower fabrication cost and higher fabrication efficiency than the FEDs utilizing microtips. However, three separate electrodes are still required for the device, i.e., a cathode, a gate electrode and an anode which must be formed in separate process steps.

In another U.S. patent application Ser. No. 09/396,536 filed Sep. 15, 1999, now U.S. Pat. No. 6,448,709 assigned to the common assignee of the present invention, a field emission display device and a method for fabricating the diode structure device using nanotube emitters as the electron emission sources were disclosed. In the diode structure FED device, the device is constructed by a first glass plate that has a plurality of emitter stacks formed on a top surface, each of the emitter stacks is formed parallel to a transverse direction of the glass plate and includes a layer of electrically conductive material such as silver paste and a layer of nanotube emitter on top. The first glass plate has a plurality of rib sections formed of an insulating material in-between the plurality of emitter stacks to provide electrical insulation. A second glass plate is positioned over and spaced-apart from the first glass plate with an inside surface coated with a layer of an electrically conductive material such as indium-tin-oxide. A multiplicity of fluorescent powder coating strips is then formed on the ITO layer each for emitting a red, green or blue light when activated by electrons emitted from the plurality of emitter stacks. The field emission display panel is assembled together by a number of side panels that joins the peripheries of the first and second glass plate together to form a vacuum-tight cavity therein. The FED device disclosed in this application can be fabricated with only two electrodes, i.e., the first electrode coated on the bottom glass panel and the second electrode coated on the top glass plate without the use of a gate electrode in-between the two plates. In this configuration, the electron emitted from the nanotube emitters do not strike the phosphor coating layer on the top glass plate as hard as they would have when a gate electrode is utilized.

Various other fabrication and performance problems have been encountered in the above-described triode and diode structured FED's. For instance, in the triode structure FED's, the fabrication process is more complex and thus more difficult to achieve products of high reliability. The thickness of the insulating dielectric layer and the spacing between the electrodes must be formed with high precision in order to achieve reliability. In the diode structure FED's, the distance between the cathode of phosphor coating and the anode of nanotube emitters must not be larger than 100 $\mu$m. This limitation must be met in order to produce an operating field at 5 volts/$\mu$m in a nanotube emitter type FED so that the driving voltage required stays in a reasonable range, i.e. smaller than 500 volts. The small distance allowed between the top plate (the anode) and the bottom plate (the cathode) causes other processing difficulties such as that of achieving a high vacuum in the cavity between the two plates, particularly when display panels of large dimensions are fabricated; and that of scattered electrons when only two electrodes are used resulting in reduced intensity and poor image quality.

In yet another diode structure FED, as shown in FIG. 2, a field emission display device 40 is provided which has a diode structure equipped with a cathode and an anode formed on the same panel substrate by using nanotube emitters as the electron emission source. The diode structure FED 40 is constructed by a bottom-glass panel 42 and a top glass panel 44. Onto the top of the bottom glass panel 42, is first deposited, by a thick film printing technique, a layer of a first electrically conductive material 46 such as a conductive paste containing metallic powder. A suitable conductive paste is one that is formed of silver powder. On top of the first conductive material layer 46 is then deposited by a thick film printing technique, a layer of a dialectic material 48 to a thickness between about 50 $\mu$m and about 500 $\mu$m. The word "about" used in the context of this writing represents a range of value that is within ±10% of the average value given. The dielectric material may be suitably a silicon oxide, silicon nitride, silicon oxynitride or any other suitable dielectric material. After the multiplicity of stacks of the dielectric material is formed, an electrically conductive silver paste material 50, or any other suitable conductive paste material, is printed on top of the dielectric layer 48. The thickness of the silver paste layer 50 screen printed may be in a range between about 5 $\mu$m and about 10 $\mu$m. To complete the fabrication of the electron emitter stacks 60, a nanotube emitter layer 52 is deposited on top of the silver paste layer 50 by a thick film printing technique to a thickness between about 5 μm and about 50 μm. It is seen that carbon nanotubes 54 are sticking out of the nanotube layer 52. On top of the first electronically conductive layer 46, is then deposited a flourescent powder coating layer 56 by a thick film printing technique. The flourescent powder coating layer 56 may be formed of a flourescent powder such as phosphor for emitting different colored lights of red, green or blue.

In the diode structure FED shown in FIG. 2, the nanotube emitter layer 22 emits electrons 58 when charged by the cathode layer 50 with a negative electric charge. In the structure shown in FIG. 2, a second cathode layer 62 may further be coated with a material such as ITO on the surface of the top glass panel 44 to repel electrons 58 emitted by the nanotube emitter layer 52 toward the anode layer 56. Ideally, all the electrons 58 should be attracted by the anode 56 or repelled by the second cathode 62 toward the anode 56. However, due to the formation of the nanotubes 54 on the top surface of the nanotube emitter layer 52, as shown in FIG. 2, electrons 58 emitted by the nanotubes formed on top of the emitter layer 52 are not projected toward the anode 56 but instead, are projected toward an anode of a neighboring pixel (not shown). The neighboring pixel is therefore lit unintentionally which leading to a loss in the color definition of the FED device. The lack of control in the scattering of electrons 58 emitted from the nanotubes 54 on top of the nanotube emitter layer 52 must be improved in order to reduce the loss in color definition and picture clarity in the FED device.

It is therefore an object of the present invention to provide a field emission display panel of diode structure that does not have the drawbacks or shortcomings of the conventional diode structure FED panels.

It is another object of the present invention to provide a field emission display panel of a diode structure wherein both the cathode and the anode are formed on the bottom glass panel.

It is a further object of the present invention to provide a field emission display panel of a diode structure wherein a dual-layer cathode and an anode are formed on the bottom glass panel.

It is another further object of the present invention to provide a field emission display panel wherein a dual-layer cathode is formed on a bottom glass panel such that all nanotubes on an outer periphery of the cathode pointing downwardly toward the bottom glass panel.

It is still another object of the present invention to provide a field emission display panel of diode structure wherein a dual-layer cathode is formed by two layers of a conductive paste material sandwiching a nanotube emitter layer therein between.

It is yet another object of the present invention to provide a method for fabricating a field emission display panel of diode structure by first depositing a layer of a conductive paste on a dielectric material, then depositing a cathode of nanotube emitters on top, curing the cathode such that the nanotube emitters flow down on the first conductive paste layer and then capping the cathode with a second layer of the conductive paste material.

It is still another further object of the present invention to provide a method for fabricating a field emission display panel of diode structure by forming a dual-layer cathode and an anode of the bottom glass panel.

It is yet another further object of the present invention to provide a method for fabricating a field emission display panel of diode structure wherein a dual-layer cathode is formed on the bottom glass panel with a nanotube emitter layer covering an outer periphery of the cathode such that all nanotubes are pointed in a downward direction toward an anode on the bottom glass panel.

SUMMARY OF THE INVENTION

In accordance with the present invention, a field emission display panel of the diode structure which has a dual-layer cathode and an anode formed on the bottom glass panel is provided.

In a preferred embodiment, a field emission display panel that has a dual-layer cathode and an anode on the same panel substrate is provided which consists of a first electrically insulating plate as a first panel substrate; a first plurality of emitters stacks that formed substantially equally spaced from each other as a pre-determined spacing in a longitudinal direction on the first electrically insulating plate, each of the emitter stacks is positioned parallel to a transverse direction of the first insulating plate and includes sequentially a layer of dielectric material, a first layer of a first electrically conductive material coated with a layer of nanotube emitters on a sidewall surface and a second layer of the first electrically conductive material on top of the nanotube emitter layer, the first layer and the second layer of the first electrically conductive material are formed in a column shape; A second plurality of electrically conductive strips formed of a substantially transparent material in-between the plurality of emitter stacks insulated from each other by the layer of dielectric material, a second plurality of flourescent powder coating strips formed on the second plurality of electrically conductive strips each for emitting a red, green or blue light upon oxidation by electrons emitted from the layer of nanotube emitters on the first plurality of emitter stacks; a second electrically insulating plate positioned over and spaced-apart on the first electrically insulating plate as a second panel substrate; and a plurality of side panels joining peripheries of the first and the second electrically insulating plate together forming a vacuum tight cavity therein.

In the field emission display panel that has a dual-layer cathode and an anode formed on the same substrate panel, the second plurality of electrically conductive strips may further include a reflective coating layer in-between the second plurality of electrically conductive strips and the first electrically insulating plate, the reflective coating layer may be formed of a metal, the first and second electrically insulating plates may be formed of a ceramic material that is substantially transparent. The first layer of the first electrically conductive material is a cathode for the field emission display panel, the first layer and the second layer of the first electrically conductive material may be a conductive paste including metal particles, the second plurality of electrically conductive strips is an anode for the field emission display panel, which may be formed of indium-tin-oxide. The layer of nanotube emitters may be formed of a mixture of nanotube dimensioned hollow tubes in a binder material. The layer of nanotube emitters may be formed of a mixture of a nanotube dimensioned hollow tubes of carbon, diamond or diamond-like carbon and a polymeric-binder. Each of the second plurality of flourescent powder coating strips emits a light of red, green or blue that is different than the light emitted by its immediate adjacent strips when activated by electrons from the first plurality of emitter stacks. The layer of dielectric material in the first plurality of emitter stacks has a thickness between about 5 μm and about 500 μm.

The present invention is further directed to a method for fabricating a field emission display panel that has a dual-layer cathode and an anode formed on the same panel substrate which can be carried out by the operating steps of providing a first electrically insulating plate as a first panel substrate; forming a first plurality of electrically conductive strips of a substantially transparent material on the first electrically insulating plate; forming a layer of a dielectric material on the first electrically insulating plate by a thick film printing technique parallel to a traverse direction of the first electrically insulating plate; forming a first layer of a second electrically conductive material in a column shape on the layer of dielectric material; depositing a layer of nanotube emitters on the columns of second electrically conductive material; curing the first panel substrate such that the layer of nanotube emitters flows and covers a sidewall surface of the column-shaped second electrically conductive material; depositing a second layer of the second electrically conductive material on top of the layer of nanotube emitters; forming a second plurality of fluorescent powder coating strips on the first plurality of electrically conductive strips each for emitting a red, green or blue light when activated by electrons emitted from the layer of nanotube emitters on the first plurality of emitter stacks; positioning a second electrically insulating plate over and spaced apart from the first electrically insulating plate for use as a second panel substrate; and joining the first and second electrically insulating plates together by side panels forming a vacuum tight cavity therein.

The method for fabricating a field emission display panel having a dual-layer cathode and an anode on the same panel substrate may further include the step of providing the first and second electrically insulating plates in substantially transparent glass plates. The method may further include the step of printing the layer of second electrically conductive material in a conductive paste that contains metal powder. The method may further include the step of depositing the layer of nanotube emitters by printing from a mixture of a binder and nanotube dimensioned hollow fibers selected from the group consisting of carbon fibers, diamond fibers and diamond-like carbon fibers. The method may further include the step of connecting a negative charge to each of the layer of second electrically conductive material and a positive charge to each of the first plurality of electrically conductive strips. The method may further include the steps of forming the plurality of electrically conductive strips by indium-in-oxide. The method may further include the step of coating a layer of a transparent electrode on a surface of the electrically insulating plate that faces the first electrically insulating plate and connecting a negative charge to the layer of transparent electrodes. The method may further include the step of coating the second multiplicity of fluorescent powder coating strips by a thick film printing technique.

BRIEF DESCRIPTION OF THE DRAWINGS

These and other objects, features and advantages of the present invention will become apparent from the following detailed description and the appended drawings in which:

FIG. 2 is an enlarged, cross-sectional view of a FED of the diode structure utilizing a nanotube emitter layer for electron emissions.

FIG. 3 is an enlarged, cross-sectional view of the present invention FED of the diode structure incorporating a dual-layer cathode and an anode formed on the bottom glass panel.

FIG. 4 is an enlarged, cross-section view of the present invention FED of diode structure of FIG. 3 after a curing process is conducted for the nanotube emitters.

DETAILED DESCRIPTION OF THE PREFERRED EMBODIMENT

Figure 1A:
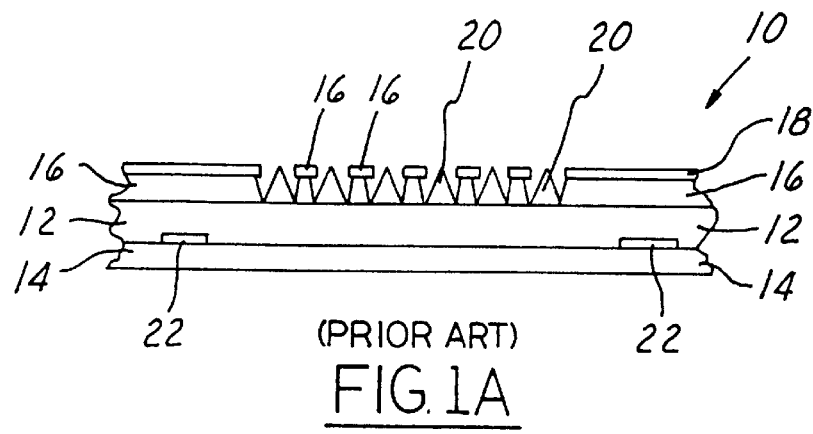
FIG. 1A is an enlarged, cross-sectional view of a conventional field emission display device utilizing microchips for electron emission.
Figure 1B:
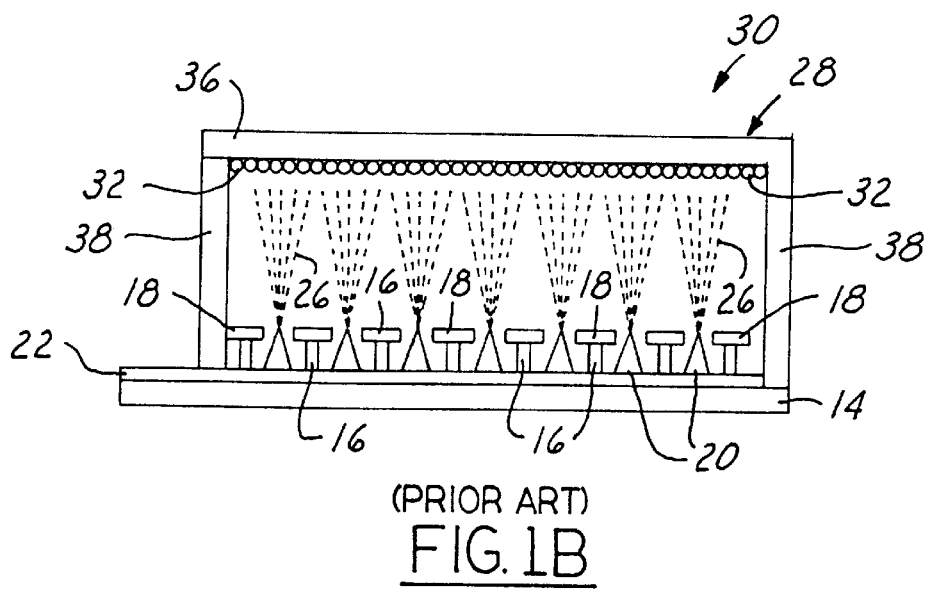
FIG. 1B is an enlarged, cross-sectional view of the conventional FED device of FIG. 1A further including an anode and side wall panels forming a sealed chamber.
Figure 1C:
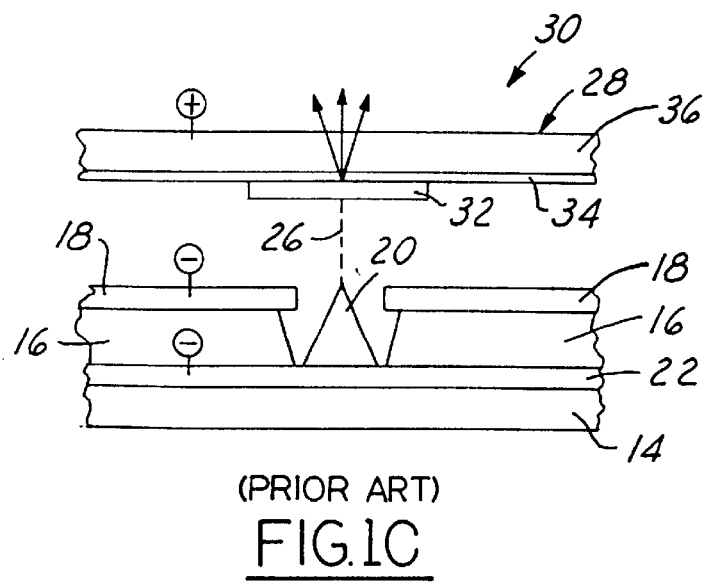
FIG. 1C is an enlarged, partial cross-sectional view of the FED device of FIG. 1B illustrating the structure of a single microchip.

The present invention discloses a field emission display panel that has a dual-layer cathode and an anode formed of the bottom glass panel in a diode structure FED. On the FED panel, an emitter stack is formed by a layer of a dielectric material, a first layer of a first electrically conductive material such as a conductive paste coated with a layer of nanotube emitters on a sidewall surface, and a second layer of the first electrically conductive material of a silver paste deposited on top of the emitter layer. The first and the second layer of the conductive paste material can be formed advantageously in a column shape. The layer of nanotube emitters that is coated on the first layer of the conductive paste is formed by depositing a nanotube emitter layer on top of the first conductive paste layer and then curing the structure such that nanotube emitters flow down on the sidewall surface of the first conductive paste column forming a coating layer on the sidewall of the column. The second conductive paste layer is deposited on top to cover up all the nanotube emitters left on a top surface on the first conductive paste layer (or column) such that no electrons may be emitted from the top surface of the cathode.

After a curing process is conducted on nanotube emitter layer, all the nanotubes that cover the sidewall surface of the first conductive paste column are pointed in a downward direction toward the anode that is formed on the bottom glass panel. The present invention novel structure therefore allows all the electrons emitted from the nanotubes projecting toward the anode and therefore any scattering of electrons toward neighboring pixels can be eliminated.

In the present invention novel apparatus and method, an electron emitter structure can be formed by a thick film printing technique. For instance, after a first silver paste electrode of larger thickness, i.e. between about 10 µm and about 20 µm, is first formed on a cathode structure, which has an increased peripheral area on the side surface of the cathode. A nanotube emitter layer is then printed on top of the first silver paste cathode layer and then cured such that all nanotubes flow down onto the sidewall surface of the silver paste electrode. A second silver paste electrode layer, of smaller thickness than the first silver paste layer, is then deposited on top of the nanotube emitters to cover the exposed nanotubes on top of the cathode structure such that no electrons can be emitted from the nanotubes left on the top surface of the cathode.

The present invention novel structure presents numerous benefits including, firstly, any electron emissions in an upward position from the top surface of the cathode is eliminated. Secondly, the density of the nanotubes formed on the sidewall surface of the cathode column is increased. Thirdly, the direction of the electron emission can be restricted to a desirable downward direction toward the anode. Fourthly, the definition and contrast of the field emission display panel can be improved.

Referring now to FIG. 3, wherein a present invention FED structure 70 is shown. The FED structure 70, of a diode design, is shown with a bottom glass panel 72 and a top glass panel 74. A top surface of the bottom glass panel 72 is first covered by an electrical conductive material layer 76, possibly of an electrically conductive paste, or a silver paste of silver powder mixed in a polymeric binder material. On top of the first electrically conductive layer 76, is then formed a plurality of dielectric layers 78 with a plurality of fluorescent coating strips 80 formed therein between.

The present invention dual-layer cathode 82 is then formed by first depositing by a thick film printing technique a thick layer 84 of a conductive paste material, a nanotube emitter layer 86 is then printed on top of the first conductive paste layer 84. A second conductive paste layer 88 is then printed on top of the nanotube emitter layer 86 forming the final structure shown in FIG. 3. It should be noted that, optionally, on a surface of the top glass plate that faces the bottom glass panel 72 may be deposited a transparent electrode layer 90 of indium-tin-oxide material as a second cathode.

In the next step of the present invention novel method, a curing process is conducted at a temperature between about 400° C. and about 500° C. for a time period between about 15 min and about 60 min, or preferably for about 30 min. The first conductive paste layer 84 may be formed to a width of between about 50 $\mu$m and about 150 $\mu$m, and to a height between about 15 $\mu$m and about 20 $\mu$m. The nanotube emitter layer 86 may be deposited to a thickness between about 5 $\mu$m and about 10 $\mu$m, and to a width between about 15 $\mu$m and about 100 $\mu$m. The second conductive paste layer 88 may be deposited to a height of about 5 $\mu$m, significantly smaller than the height of the first conductive paste layer 84. For easier vacuum evacuation between the bottom glass panel 72 and the top glass plate 74, a suitable distance between the two glass plates should be about 1.1 mm.

After the curing process is conducted, the nanotube emitter layer 86 flows, due to the nature of the polymeric binder material, to form the final structure of FIG. 4. The nanotubes 100 are exposed and covers a peripheral surface, or a sidewall surface of the column-shaped first conductive paste layer 84. Electrons 98 emitted by the nanotubes 100 are directed toward the anode 80 since all nanotubes 100 are pointed downwardly during the nanotube curing step. It should be noted that when a negative charge is applied to the ITO electrode layer 90 on the top glass 74, the ITO electrode 90 repels electrons 98 downwardly toward the anode 80. The second conductive paste layer 88 effectively covers any nanotubes that may have left on top of the first conductive paste layer 84 and therefore effectively stops those nanotubes from emitting electrons in an upward direction.

The present invention novel structure of a dual-layer cathode formed on the same glass panel as the anode layer eliminates any upwardly projected electrons by increasing the density of nanotubes formed on the peripheral, or sidewall surface of the cathode. The direction for the projection of electrons is therefore limited downwardly toward the anode and consequently, the definition and contrast of the FED panel are improved.

The present invention novel apparatus of a field emission display panel that has a dual-layer cathode and an anode formed on the bottom glass panel and a method for such fabrication have therefore been amply described in the above description and in the appended drawings of FIGS. 3 and 4.

While the present invention has been described in an illustrative manner, it should be understood that the terminology used is intended to be in a nature of words of description rather then of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows.

What is claimed is:

1. A field emission display panel having a dual-layer cathode and an anode on the same panel substrate comprising:
    a first electrically insulating plate as a first panel substrate;
    a first plurality of emitter stacks formed substantially equally spaced from each other at a predetermined spacing in a longitudinal direction on said first electrically insulating plate, each of said emitter stacks being positioned parallel to a transverse direction of said first insulating plate and comprises sequentially a layer of a dielectric material, a first layer of a first electrically conductive material coated with a layer of nanotube emitters on a sidewall surface and a second layer of the first electrically conductive material coated on top of said nanotube emitter layer, said first layer and said second layer of the first electrically conductive material are formed in a column shape;
    a second plurality of electrically conductive strips formed of a substantially transparent material in-between said plurality of emitter stacks and are insulated from each other by said layer of dielectric material;
    a second plurality of fluorescent powder coating strips formed on said second plurality of electrically conductive strips each for emitting a red, green or blue light upon activation by electrons emitted from said layer of nanotube emitters on said first plurality of emitter stacks;
    a second electrically insulating plate positioned over and spaced-apart from said first electrically insulating plate as a second panel substrate; and
    a plurality of side panels joining peripheries of said first and second electrically insulating plates together forming a vacuum-tight cavity therein.

2. A field emission display panel having a dual-layer cathode and an anode on the same panel substrate according to claim 1, wherein said second plurality of electrically conductive strips further comprises a reflective coating layer in-between said second plurality of electrically conductive strips and said first electrically insulating plate.

3. A field emission display panel having a dual-layer cathode and an anode on the same panel substrate according to claim 2, wherein said reflective coating layer being formed of a metal.

4. A field emission display panel having a dual-layer cathode and an anode on the same panel substrate according to claim 1, wherein said first and second electrically insulating plates are formed of a ceramic material that is substantially transparent.

5. A field emission display panel having a dual-layer cathode and an anode on the same panel substrate according to claim 1, wherein said first layer of the first electrically conductive material is a cathode for said field emission display panel.

6. A field emission display panel having a dual-layer cathode and an anode on the same panel substrate according to claim 1, wherein said first layer and said second layer of a first electrically conductive material is a conductive paste comprising metal particles.

7. A field emission display panel having a dual-layer cathode and an anode on the same panel substrate according to claim 1, wherein said second plurality of electrically conductive strips is an anode for said field emission display panel.

8. A field emission display panel having a dual-layer cathode and an anode on the same panel substrate according to claim 1, wherein said second plurality of electrically conductive strips is formed of indium-tin-oxide (ITO).

9. A field emission display panel having a dual-layer cathode and an anode on the same panel substrate according to claim 1, wherein said layer of nanotube emitters being formed of a mixture of nanometer dimensioned hollow tubes and a binder material.

10. A field emission display panel having a dual-layer cathode and an anode on the same panel substrate according to claim 1, wherein said layer of nanotube emitter being formed of a mixture of nanometer dimensioned hollow tubes of carbon, diamond or diamond-like carbon and a polymeric-based binder.

11. A field emission display panel having a dual-layer cathode and an anode on the same panel substrate according to claim 1, wherein each of said second plurality of fluorescent powder coating strips emits a light of red, green or blue that is different than the light emitted by its immediate adjacent strips when activated by electrons from said first plurality of emitter stacks.

12. A field emission display panel having a dual-layer cathode and an anode on the same panel substrate according to claim 1, wherein said layer of dielectric material in said first plurality of emitter stacks has a thickness between about 5 $\mu$m and about 500 $\mu$m.

* * * * *